Patented Mar. 12, 1929.

1,704,733

UNITED STATES PATENT OFFICE.

FRANK A. FAHRENWALD, OF CLEVELAND HEIGHTS, OHIO.

ALLOY.

No Drawing.     Application filed May 19, 1924. Serial No. 714,290.

This invention relates to refractory apparatus and has for its object the provision of a metallic composition of matter which shall withstand higher temperatures under exposed conditions than any other known to man; the provision of apparatus made of a composition of matter which possesses thermal and electrical conductivity and is resistant to temperatures of 2200 to 3200 degrees Fahrenheit and which, in addition to being free from melting at these temperatures, shall suffer no surface deterioration under conditions usually encountered in common high temperature industrial operations; while further objects and advantages of the invention will become apparent as the description proceeds.

Apparatus of platinum and platinum alloys is known to possess a melting point up to 3200° Fahrenheit with the advantages of metallic conductivity, both electrical and thermal and a high degree of strength; but this offers the disadvantage of being extremely expensive, obtainable only in small forms, and rapidly disintegrated under reducing conditions. Apparatus made of certain alloys of chromium with iron group metals will withstand temperatures up to about 2200 degrees Fahrenheit, under both oxidizing and reducing conditions, but is unusable at higher temperatures. There are a few non-metallic compositions which can be used at temperatures about 2500 degrees Fahrenheit but these have the disadvantages of being poor conductors of heat and electricity, and also being very brittle and fragile. As an example of one simple need existing in the practical art, there is no previously known composition for making a lasting hearth plate or muffle for the heat treatment of high speed steel which requires a temperature of approximately 2300 degrees Fahrenheit, and numerous other high-temperature requirements exist in connection with the preparation, reduction, melting, alloying, compounding, casting, and heat treating of metals and alloys and in the preparation, compounding and dissociation of numerous non-metallic substances.

According to my invention I make apparatus for the high temperature uses described from an alloy of aluminum and chromium, containing a substantial amount of each metal, and preferably a preponderance of the metal of higher melting point. The highest melting point is reached when these ingredients occur substantially in proportion of aluminum 15, chromium 85; but these strict proportions are not imperative since a considerable excess of either of the component metals makes a practicable alloy with this composition and without any large lowering of the melting point. However, an excess of chromium over these proportions is preferable to an excess of aluminum, wherefore the preferred compositions are approximately as follows:

Chromium 97% to 80%, aluminum 3% to 20%.

Chromium 95% to 85%, aluminum 5% to 15%.

Chromium 85%, aluminum 15%.

The last named composition affords the highest possible thermal resistivity obtainable with alloys of these two metals, and has a melting point of about 3500° F. I have subjected a plate of this material to the action of the highest temperature obtainable by the direct impact of an oxy-acetylene flame for a period of several weeks without change of physical or chemical condition or appearance.

I do not restrict myself to any one mode of producing this alloy. The aluminothermic reaction may be used whereby a quantity of chromic-oxid is intimately mixed with the amount of finely divided aluminum necessary to reduce the same, plus a sufficient excess of aluminum to alloy with the liberated chromium. This reaction is very powerfully exo-thermic and where the mix is preheated before ignition produces an alloy in a completely molten condition. The admixture of small amounts of double salts of chromium with alkaline metals, such as sodium or potassium chromate, is beneficial in starting the reaction as is also the presence of certain more easily reducible oxides as of tungsten, molybdenum, etc.

I have also found that when molten aluminum and molten chromium are poured together, a violent exo-thermic reaction takes place, and if the two metals are each at a sufficiently high temperature before mixing, the heat of this reaction added to the heat content of the already molten metals is sufficient to produce a temperature above the melting point of the alloy. The high temperature required to melt this alloy directly is almost impossible to attain by any direct melting process available commercially at the present time.

I have had some difficulty in procuring refractory materials suitable for melting containers and casting molds. Aluminum oxide may be used in some cases, but its melting point is not much higher than that of the alloy. I have used zirconium oxide also but it is quite expensive. Fused magnesite has proved quite satisfactory but at these high temperatures there is some reduction of magnesium oxide by the aluminum of the alloy.

I have found it thus far possible to make only simple forms which can be cast directly, since the composition is extremely hard and not easy to forge, weld, cut, bore or otherwise mechanically treat excepting by grinding.

It is possible with a metallic container of this type to melt aluminum and even the ferrous metals and their alloys and to perform any other functions heretofore impossible with any known composition and I do not limit myself in any wise except as recited in my several claims.

This alloy may also be used in a crushed or granulated condition, for electric resistence heating, or for abrading purposes, or this granulated material may be bended or sintered together to form bricks, plates, crucibles, or other forms. It is also a fairly good conductor of electricity in the integral metallic form having a resistance considerably higher than the alloys customarily employed for this purpose such as those of chromium with iron group metals. It possesses the advantage over carborundum, carbon and other non-metallic resistors hitherto used or suggested for very high temperatures, that its temperature coefficient is positive. Also it exhibits a very high degree of resistance to the action of most corrosive chemicals.

Having thus described my invention what I claim is:

1. Heat resisting alloy casting of aluminum 3 to 20% and chromium 97 to 80%.

2. Heat resisting alloy casting of aluminum 5 to 15% and chromium 95 to 85%.

3. Apparatus for high temperature use made of an alloy containing aluminum 3 to 15% and chromium 97 to 85%.

4. Apparatus for high temperature use made of an alloy containing approximately 15% aluminum and 85% chromium.

5. An electric resistance element consisting essentially of an intermetallic compound containing from 3 to 20% of aluminum and from 97 to 80% of chromium which is solid and homogeneous at temperatures above 2500° Fahrenheit.

6. Process of producing an alloy of aluminum and chromium having a melting point above 3000° F. which contains the steps of melting the ingredients separately and pouring them together whereby the heat produced by their combination may raise the temperature above the melting point of the resultant alloy.

In testimony whereof I hereunto affix my signature.

FRANK A. FAHRENWALD.